United States Patent [19]

Ito

[11] Patent Number: 4,803,765
[45] Date of Patent: Feb. 14, 1989

[54] INDEX HEAD

[75] Inventor: Hidetoshi Ito, Nagano, Japan

[73] Assignee: Mikado Metal Industry Co., Ltd., Japan

[21] Appl. No.: 184,436

[22] Filed: Apr. 21, 1988

[30] Foreign Application Priority Data

Apr. 27, 1987 [JP] Japan ................... 62-104063

[51] Int. Cl.4 .................. B23B 29/32; B23Q 17/02
[52] U.S. Cl. ................... 29/48.5 R; 74/816; 74/822
[58] Field of Search ............ 29/48.5 R, 48.5 A; 74/813 R, 813 C, 813 L, 816, 822; 409/221

[56] References Cited

U.S. PATENT DOCUMENTS

| 3,085,452 | 4/1963 | Thompson | 74/813 R X |
| 3,120,134 | 2/1964 | Sweeney | 74/813 R V |
| 3,256,752 | 6/1966 | Guttman et al. | 74/813 R |
| 3,440,905 | 4/1969 | Tomiyama | 74/822 |
| 3,581,602 | 6/1971 | Bachmann | 74/822 |
| 3,888,140 | 6/1975 | Mackelvie | 74/822 X |
| 4,028,966 | 6/1977 | Taylor | 74/822 |
| 4,095,489 | 6/1978 | Hasegawa | 29/485 A |
| 4,606,244 | 8/1986 | Schneemann | 74/816 |
| 4,721,017 | 1/1988 | Jorgensen et al. | 29/48.5 R |

FOREIGN PATENT DOCUMENTS

| 696115 | 10/1964 | Canada | 74/813 R |
| 2484887 | 12/1981 | France | 74/816 |
| 2059542 | 4/1981 | United Kingdom | 74/813 C |

Primary Examiner—William Briggs
Attorney, Agent, or Firm—Hall, Myers & Rose

[57] ABSTRACT

An index head provided with a long rack and a short rack which are slided alternatively towards an index table by the movement of a pinion of a piston rod. The long rack which is characterized to move at a speed twice a forwarding speed of the piston rod, gives to the index table a revolution corresponding to desired divisions. Immediately upon the completion of said revolution of the index table, the short rack which becomes then movable at a speed twice the forwarding speed of the piston rod, brings about, in cooperation of the rotary movement of the pinion, the engagement of the piston rod with the index table, whereby inertia given to the index table through its revolution by the long rack is prevented so as to attain accurate divisions.

6 Claims, 5 Drawing Sheets

INDEX HEAD

BACKGROUND OF THE INVENTION

This invention relates to an index head which is employed for the assembly or the machining of parts, and provides the index head which eliminates troublesome inertia produced especially in the indexing of equal divisions of a small number having a comparatively large angular distance therebetween and which is of a small size and can perform indexing at a high speed and with high accuracy.

When the indexing of equal divisions of a comparatively small number such as 2–3 divisions is made by a conventional index head employing a cylinder, a stroke length of the cylinder has to be large enough to meet an expected large feeding angle, whereby the index head as a whole becomes also large. As a revolution angle of an index head table for such indexing is large, inertia thereof becomes also larger, whereby it has been difficult to stop the table accurately and swiftly at a predetermined position.

BRIEF SUMMARY OF THE INVENTION

In view of the above, this invention is to provide an index head which can perform the indexing of divisions of a small number with high accuracy and a rapid motion in spite of cylinder thereof having a short stroke, and which is made therefore compact.

This invention is explained hereinunder further in detail with reference to the accompanying drawing which illustrates an example of indexing of 2 divisions by the index head made in accordance with this invention.

DETAILED DESCRIPTION OF THE INVENTION

Figure 1:
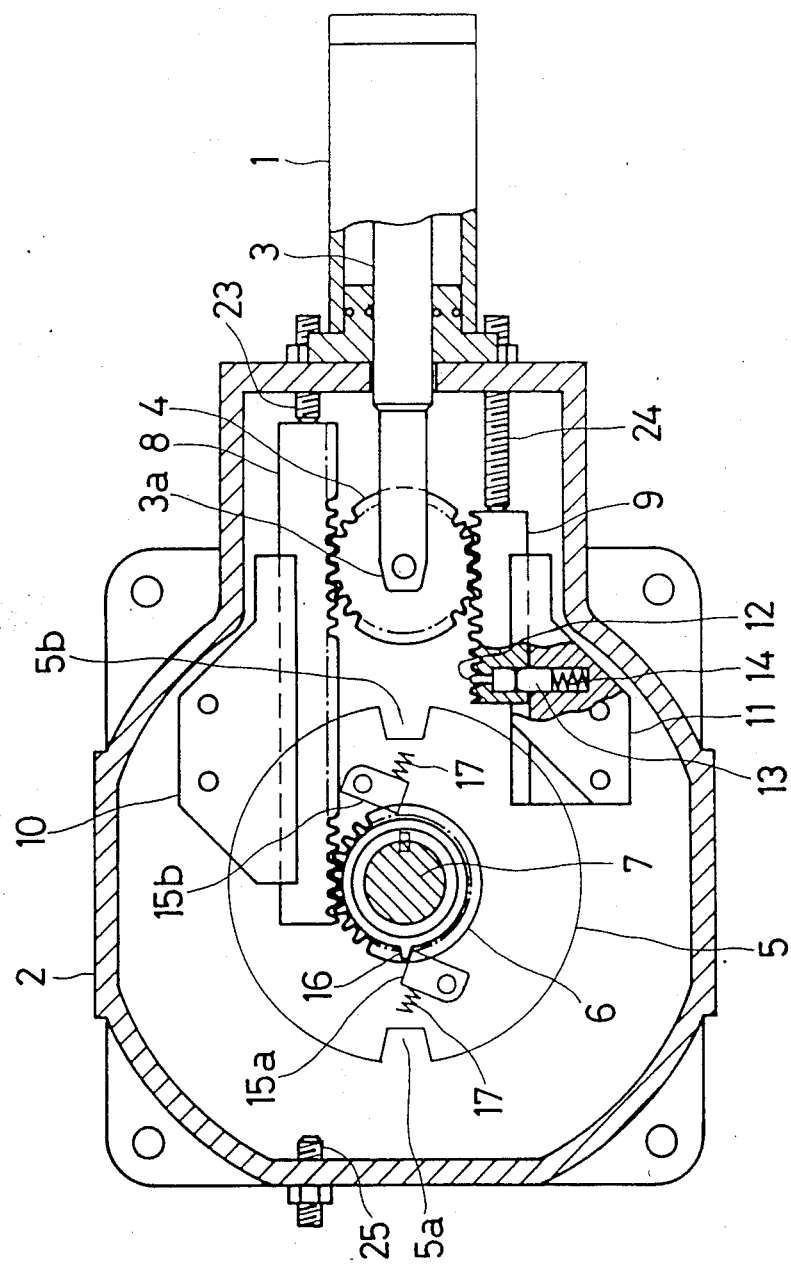
FIG. 1 is a plan view of an embodiment of an index head made in accordance with this invention, showing mechanisms contained therein.

With reference to FIG. 1, a pneumatic or hydraulic cylinder 1 is fitted to an outside wall of a body casing 2. A piston rod 3 of the cylinder 1 is in the body casing 2, while there is pivoted horizontally at a forward end 3a of the rod 3 a pinion 4.

Numeral 5 indicates a rotary disk which is fitted to a rotary shaft 7 located centrally in the body casing 2 and ahead of a moving direction of the piston rod 3, and which is horizontally rotatable with the rotation of the rotary disk 5. This rotary disk is located at a level same to the piston rod 3 and has at its circumferential wall a pair of cut-out portions 5a, 5b which face to each other with a central axis of the disk therebetween, so that the tapered forward end 3a of the rod 3 can be engageable insertedly with said cut-out portions 5a, 5b when said rod 3 is moved towards the center of body casing 1. When 3 divisions are to be indexed, said cut-out portions shall be three provided 10 at the circumferential wall of the disk 5 with an equal angular distance therebetween.

A main toothed wheel 6 which is journaled under and coaxially to the disk 5, meshes with a long rack 8 with which the pinion 4 also meshes. A short rack 9, toothed surface of which faces against a toothed surface of the long rack 8 with the pinion 4 therebetween, meshes only with the pinion 4. The long and short racks 8, 9 are respectively supported slidably by supporting fixtures 10, 11. Both the long and short racks always mesh with the pinion 4. When either one of them 8, 9 is kept immovable and the piston rod 3 is forwarded, the pinion 4 is rotated upon one of the racks which is kept immovable and its rotary meshing with another rack moves said another rack forward. This forwarding movement is done by a forwarding speed of the piston rod 3 added by a forwarding speed produced by the revolution of the pinion 4, and is just twice the forwarding speed of the piston rod 3.

Numeral 12 indicates a short pin which is inserted into a through hole 9a provided to the short rack 9 at its forward end and transversely to its toothed surface and which has a length substantially equal to the thickness of the short rack 9. A pressing piece 13 which is accommodated vertically in the supporting fixture 11 at its middle portion, is biased towards the short rack 9 by a spring 14 accommodated also in the supporting fixture. When the short rack 9 is at its most retracted position, the pressing piece 13 is insertedly engaged with the through hole 9a of the short rack 9 so as to prevent said short rack from making a sliding movement and so as to protrude the short pin 12 from the toothed surface of the short rack.

A pair of engagement pawls 15a, 15b are pivoted to a lower surface of the rotary disk 5 at locations adjacent to its cut-out portions 5a, 5b so as to form ratchet mechanisms of the rotary disk 5. Said engagement pawls 15a, 15b are respectively biased by a compression springs 17 so that a part of each of them is within a rotary path of a horizontal projection 16 provided integrally with and to an upper surface of the main toothed wheel 6. Thus, when the horizontal projection 16 rotates with the main toothed wheel 6 to a predetermined direction (namely, counterclockwise in the drawing), the projection comes into abutting engagement with one of the engagement pawls 15a, 15b whereby the rotary disk 5 and consequently the rotary shaft 7 are rotated. When the horizontal projection 16 is rotated with the main toothed wheel in an opposite direction, the horizontal projection 16 presses the engagement pawls 15a, 15b against the springs 17 so as to displace the pawls outside the rotary path of the projection 16, whereby the projection 16 runs idle with the main toothed wheel.

Figure 2:
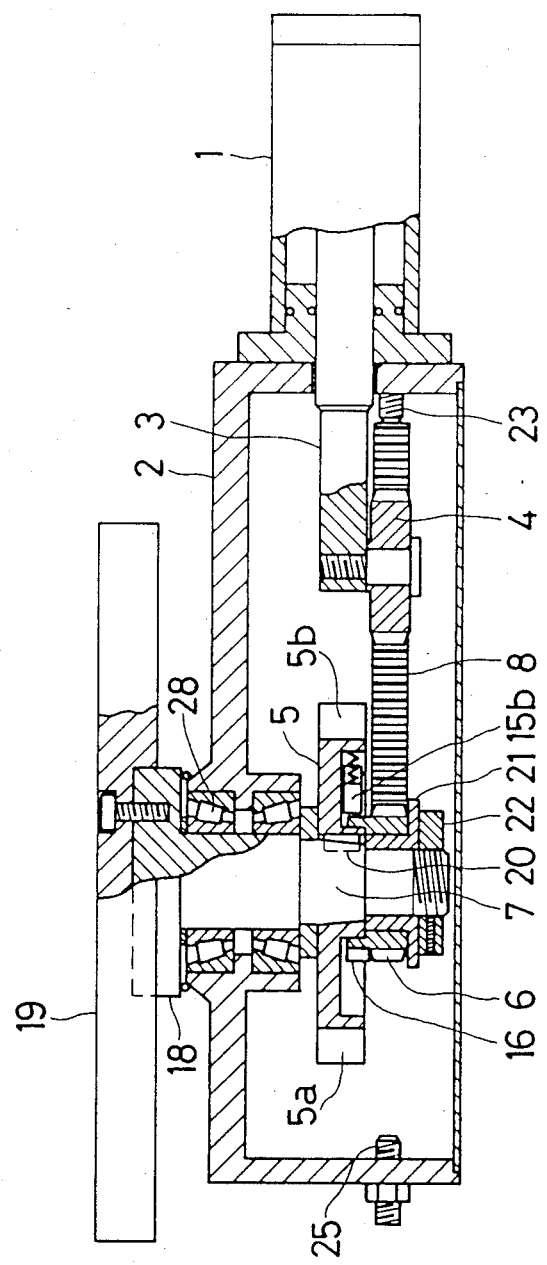
FIG. 2 is a sectional view of said index head.
Figure 3:
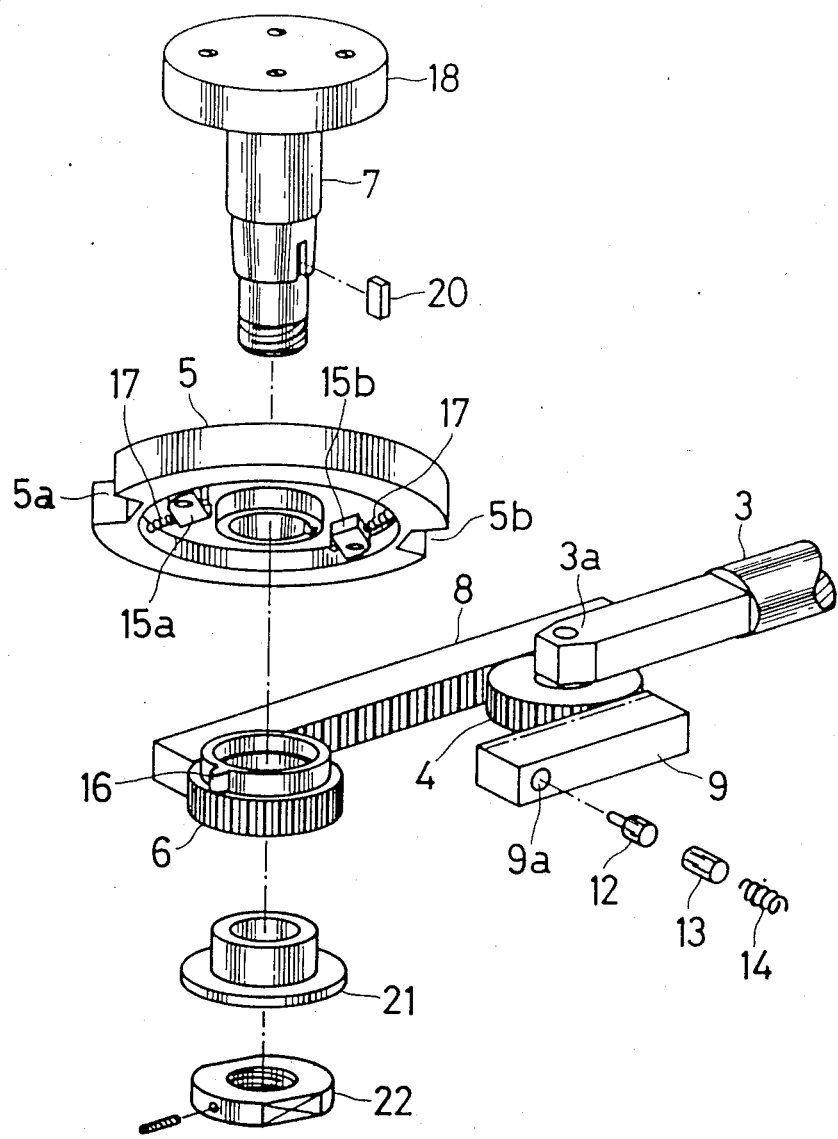
FIG. 3 is a perspective view of a principal part of the mechanisms which has been disassembled.

The top of the rotary shaft 7 is formed to a fitting plate 18 which is projected outside of the casing body 2 and fitted to an index table 19 as illustrated in FIG. 2. The bottom surface of the fitting plate 18 is journaled by 10 bearings 25 provided to the body casing 2. Numeral 20 indicates a key for fixing the rotary disk 5 to the rotary shaft 7, 21 a washer for the main toothed wheel, and 22 a locking nut threadedly fitted to the lower end of the rotary shaft 7.

Figure 4A:
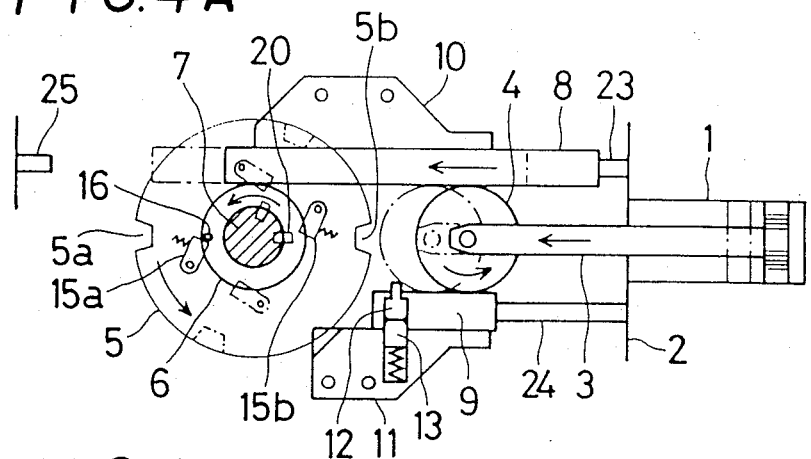
FIGS. 4A to 4C are explanatory views showing the operation of the mechanisms.
Figure 4B:
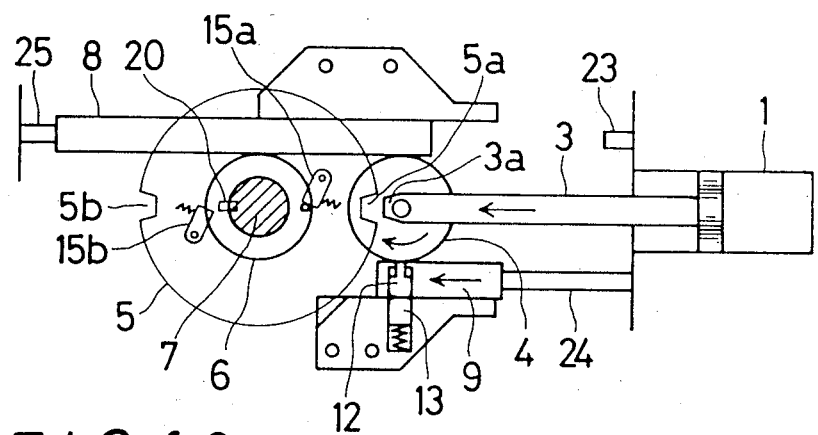
Figure 4C:
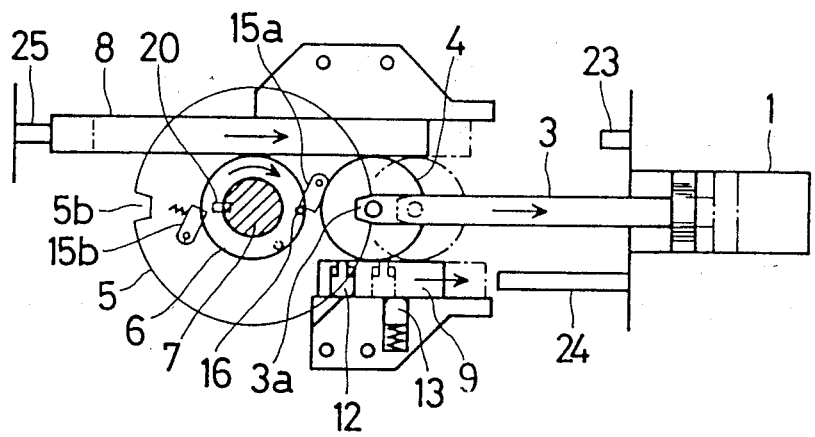

Now, the index head made in accordance with this invention and having constructions as explained above operates as follows. With reference to FIGS. 4A to C, to the inside of the casing body 2, there are provided stoppers 23, 24 which determine the most retracted positions of the long and short racks 8, 9 and another stopper 25 which determines the forwardmost position of the long rack 8. These stoppers 23, 24, 25 are adjustable manually from the outside of the casing body.

When both the long and short racks 8, 9 are at the most retracted positions and when the horizontal projection 16 of the main toothed wheel 6 engages with one of the engagement pawl 15a at a diametrically opposite position of the cylinder 1 with the rotary shaft 7 therebetween, the short rack 9 is prevented to make a forward movement on account of its engagement with the pressing piece 13 protruded from the supporting fixture 11. Under this condition, when the piston rod 3 starts to move forward by the operation of the cylinder 1, the pinion 4 of the piston rod 3 advances, rotating upon the toothed surface of the short rack 9, whereby the long rack 8 is forwarded at a speed twice the forwarding speed of the rod 3 and the main toothed wheel 8 is rotated so as to rotate the rotary disk 5 and consequently the rotary shaft 7 through the concurrent engagement of the horizontal projection 16 with the pawl 15a (FIG. 4A).

Then, when the rotary shaft is rotated to 180°, the long rack 8 abuts against the forward stopper 25. By this moment, the cut-out portion 15a located adjacently to the engagement pawl 15a has been rotated to confront the forward end of the piston rod 3 so as to be ready to receive said rod therein. Likewise, the forward end of the said piston rod 3 has reached by this time just the front of the cut-out portion 5a. And, at this moment, the pinion 4 has been forwarded to a position where it treads on the short pin 12 which projects upon the toothed surface of the short rack 9. The treading of the pinion 4 upon the short pin 12 causes the pin to move downwardly, whereby the pressing piece 13 is released from its engagement with the short rack 9, and whereby the bottom end of the short pin 12 is brought to a level equal to a sliding surface between the short rack and the supporting fixture so that the short rack can move now forward (FIG. 4B).

When the piston rod is moved further forward, the pinion rotates this time upon the toothed surface of the long rack which is prevented to move forward by the stopper 25, while the short rack is slided forward also at a speed twice the forward movement of the rod 3. Thus, the tapered free end 3a of the rod 3 comes into the cut-out portion 5a of the rotary disk instantaneously when said disk completes a half revolution, so that the rotation of said rotary disk is stopped instantaneously and with high accuracy. Thus, the index table 19 fitted to the top of the rotary shaft 7 is halted firmly and accurately when it has revolved to 180°.

Then, when the piston rod 3 retreats by an reverse operation of the cylinder 1, the pinion 4 which can not rotate as it meshes with both of the then retreatable racks 8, 9, has the long and short racks slidingly retreated simultaneously without rotating by itself. And, when the short pin 12 of the short rack 9 retreats to the position where the pressing piece 13 is located, the pressing piece 13 presses the short pin 12 upwardly, whereby the pressing piece 13 comes into the through hole 9a. At the same time, the rear end of the short rack 9 abuts against the stopper 24. Thereby, the short rack 9 is halted, whereby the pinion 4 can rotate backward along the toothed surface of the short rack 9, and the long rack 8 retreats by the backward movement of the piston rod 3 and the rotation of the pinion 4 at a speed twice the retreating speed of the rod 3.

During the above-mentioned operation, though the main toothed wheel 6 meshing with the long rack 8 rotates in a direction opposite to the one mentioned above, the rotary disk 5 and the table 19 fitted to the disk are not rotated because the horizontal projection 16 of the toothed wheel 6 is not engaged with the pawl 15a. Along with the retreat of the long rack 8, the horizontal projection 16 comes to an 10 engagement with another pawl 15b, and when the long rack 8 is halted by the stopper 23 to its most retreated position, the projection 16 passes the pawl 15b, whereby the index head comes back to its original position as shown in FIG. 1A except that the rotary disk have been turned to 180°. The index head is now ready to repeat the above-mentioned cycle of operation.

As explained above, when the piston rod 3 moves forward, the rotary shaft 7 makes a half or 180° revolution by the movement of the main toothed wheel 6 driven by the long rack 8, and is then locked by the engagement of the forward end 3a of the rod with one of the cut-out portions 5a, 5b of the disk 5, and when the piston rod retreats, the rotary shaft 7 is not driven since the main toothed wheel rotates idly. This means that the index table fitted to the top of the rotary shaft 7 is rotated by the cylinder 1 stepwise only in a predetermined single direction by 180° at each time.

Damping mechanisms not shown in the drawing which exerts damping effects only in a direction opposite to the rotary direction of the table 19 may be provided to the lower side of said table so that the table shall not be unsteady when it is unlocked while the rod 3 retreats.

Figure 5:
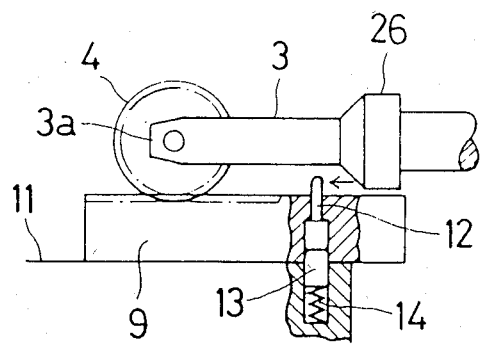
FIGS. 5 to 7 are explanatory views illustrating other embodiments of stopping and releasing means of the sliding of a short rack rod.
Figure 6:
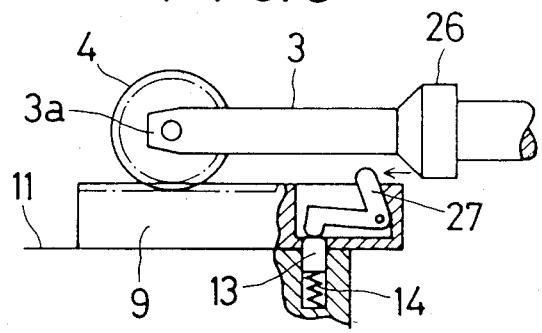
Figure 7:
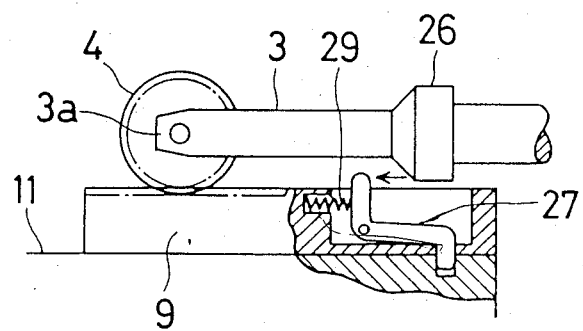

In FIGS. 5 to 7, there are shown other embodiments of mechanisms which control the sliding movement of the short rack 9. In this connection, it shall be noted that the short rack 9 is retarded to make a forward sliding movement so that the long rack 8 can make a forward sliding movement at a speed twice the forwarding speed of the rod 3, and such retardation is released when the forward end 3a of said rod is nearly to engage with either one of the cut-out portions 5a, 5b. In order to afford the short rack 9 such retardation, it is not always necessary to employ such constructions as illustrated in FIGS. 1 to 4 in which the short pin 12 projected upon the front toothed surface of the short rack 9 is pressed down by tooth of the pinion 4. For example, such mechanisms as illustrated in FIG. 5 are 20 employable, in which there is provided to the rod 3 at its middle portion an expansion 26 to which the short pin 12 is biased to engage. The short pin is provided in this case to a rear extension of the short rack 9, which extension is not toothed because it does not mesh with the pinion 4. Immediately before the forward end 3a of the rod 3 engages with one of the cut-out portions 5a, 5b, the expansion 26 presses the short pin 13 downward so that the short rack becomes slideable.

In the example shown in FIG. 6, in place of the short rack 9 itself, to the extension of the short rack there is pivoted a crank arm 27 which is swingable about its middle portion. As a basic end of the crank arm 27 is pressed upward by the pressing piece 13 insertedly supported by the supporting fixture 11, the other upper end of the arm is biased so as to project outside of the short rack 9. When the forward end 3a of the rod 3 is progressed to a predetermined distance, the expansion 26 of the rod abuts against the upper end of crank arm 27, whereby its basic end presses down the pressing piece and releases the retardation of sliding movement of the short rack 9.

In the example shown in FIG. 7, the pressing piece 13 which is provided to the supporting fixture 11 and projects partly into the short rack 9, is eliminated. The crank arm 27, middle portion of which is pivoted to the rear extension of the short rack 9 and which is swingable about said middle portion, is biased by a compression spring 29 so that its top end projects upwardly towards the short rack, and its basic end is insertedly engaged with the supporting fixture 11. The abutting of the expansion 26 of the rod 3 with the top end of the crank arm when the rod is advanced to a predetermined distance, brings about the release of the crank arm from the supporting fixture.

Although the above description is made with respect to the indexing of 2 divisions by means of the index head made in accordance with this invention, other divisions such as 3 divisions, that is, divisions with an angular distance of 120 degrees each can be achieved by adjusting (shortening) a stroke of the cylinder 1 to an appropriate length, also adjusting (elongating) a protruding length of the stopper which lies ahead of the long rack 8, providing to the rotary disk 5 three of the cut-out portions with an equal angular distance therebetween, and providing to the rear surface of rotary disk 5 along its circumferential edge three pieces of the engagement pawls 15 with an equal angular distance therebetween. In case of indexing 4 and more divisions, the cut-out portions and the engagement pawls are to be provided at a number corresponding to the number of divisions. Instead of providing a plurality of pawls 15, said pawl could be single, provided that the horizontal projection 16 which comes into engagement with said pawl is provided to an upper circumferential wall of main toothed wheel 6 in the plural corresponding to a number of divisions.

As explained above, the long and short racks which face to each other with their toothed surfaces and mesh with the pinion of the forward end of the piston rod, are driven alternatively at a speed twice the movement of the piston rod. This means that compared to a conventional index head, table rotating shaft of which is driven by a single long rack, rotary velocity of a table shaft of the index head made in accordance with this invention is large and a stroke length of its cylinder can be shorter whereby it is made compact as a whole. In addition to this advantage, extremely accurate indexing can be obtained in this invention, since when the index table or head is rotated to a predetermined angular distance, the table is locked by the forward end of the piston rod which is insertedly engaged with one of the cut-out portions provided to the circumferential wall of the rotary disk which is fitted below and coaxially with the table.

It shall be noted also that a movement of the index table by inertia which is inevitably produced in the indexing of divisions of a small number such as 2 or 3 in a conventional index head which is driven by a cylinder, is effectively eliminated in this invention, since a protrusion length of the stopper which is ahead of the long rack can be adjusted so that said long rack shall be retarded to slide forward a little before the forward end of piston rod is brought to a position where said end is engageable with the cut-out portion of the rotary disk. That is, inertia produced by the rotary movement of the disk decreases sharply when the long rack abuts against the stopper. And, immediately and only after the disk rotates a bit by a decreased inertia, the piston rod comes to engage with the disk, whereby the rod and the cut-out portion of the disk can make a smooth engagement.

As readily be seen from the above, the present invention has many advantageous points that indexing of divisions of a small number can be made by compact constructions and at speed and with high accuracy, and that constructions thereof are simple and easy to manufacture.

I claim:

1. An index head comprising a rotary shaft fitted at its top end an index table located outside of a body casing; a disk coaxially fitted to a middle portion of the rotary shaft within the body casing and provided at its circumferential edge a plurality of cut-out portions which are of a number equal to a number of divisions to be indexed and located with an equal angular distance therebetween; said disk having at its bottom surface and along its circumferential edge one or more ratchet pawls which are located with an equal angular distance therebetween when the pawls are more than one; a main toothed wheel located under the disk, journaled to the rotary shaft so as to be able to rotate idle, and provided at its top and along its circumferential edge one or more horizontal projections which are integral with the main toothed wheel and with an equal angular distance therebetween when the projections are more than one; either of said ratchet pawls and said horizontal projections being of a number corresponding to the number of divisions when the other of them is single, and said ratchet pawls being biased so as to be partly within a rotary path of the horizontal projections and so as to be ratchedly engageable with the projections only in a predetermined rotary direction of the main toothed wheel; a cylinder provided to the body casing and having a piston rod which is directed to a central axis of the rotary shaft and having pivotably mounted at its forward end a horizontally extending pinion; a long rack which meshes with said horizontal pinion and is slidable towards and from the main toothed wheel; and a short rack which faces the long rack in parallel therewith and with the pinion therebetween and which is slidably supported by a supporting fixture; either one of said short rack and said supporting fixture being provided with mechanisms which retard the sliding movement of the short rack until the forward end of the piston rod reaches to a predetermined position and which release such retardation when said forward end reaches said predetermined position so that said forward end which is shaped so as to be engageable with the cut-out portions of the disk, comes into engagement with one of said cut-out portions.

2. The index head as claimed in claim 1, in which the mechanisms which retard the sliding movement of the short rack and release such retardation of the movement, comprise a pressing piece accommodated to the supporting fixture and biased so as to project into a vertically extending through hole provided to a front toothed surface of the short rack; and a short pin movably inserted into the through hole and abutting at its lower end with the pressing piece so as to protrude from the toothed surface; said pin when pressed by the pinion, suppressing downwardly the projection of the pressing piece into the supporting fixture whereby the retardation of the movement given by said projection to the short rack is released.

3. The index head as claimed in claim 1, in which the mechanisms which retard the sliding movement of the short rack and release such retardation of the movement, comprise a pressing piece accommodated to the supporting fixture and biased so as to project into a vertically extending through hole provided to a rear extension of the short rack; and a short pin movably inserted into the through hole and abutting at its lower end with the pressing piece so as to protrude from said extension; said pin when pressed by an expansion provided to a middle part of the piston rod at the moment that said piston rod advances to a predetermined distance, concurrently suppressing downwardly the projection of the pressing piece into the supporting fixture whereby the retardation of the movement given by said projection to the short rack is released.

4. The index head as claimed in claim 1, in which the mechanisms which retard the sliding movement of the short rack and release such retardation of the movement, comprise a pressing piece accommodated to the supporting fixture and biased so as to project vertically into an engagement with a rear extension of the short rack; and a crank arm swingably pivoted to said rear extension and abutting at its lower arm with the pressing piece so that its upper arm protrudes outwardly from said extension; said crank arm when pressed at its upper arm by an expansion provided to a middle part of the piston rod at the moment that said piston rod advances to a predetermined distance, concurrently suppressing downwardly by its lower arm the pressing piece and leasing the engagement of said pressing piece with the rear extension of the short rack.

5. The index head as claimed in claim 1, in which the mechanisms which retard the sliding movement of the short rack and release such retardation of the movement, comprise a crank arm swingably pivoted to a rear extention of the short rack and biased so that its upper arm normally protrudes outwardly from said extension and its lower arm engages with a stationary supporting fixture so as to prevent the short rack from moving, said crank arm when pressed at its upper arm by an expansion provided to a middle part of the piston rod at the moment that said piston rod advances to a predetermined distance, releasing the engagement of its lower arm with the supporting fixture so that the short rack is free to slide by the piston rod.

6. The index head as claimed in claims 1, 2, 3, 4, or 5, in which stoppers are provided to the body casing in both the forward and backward moving directions of the long rack whereby forward and backward sliding strokes of the long rack are adjustable in accordance with a number of divisions to be indexed.

* * * * *